United States Patent
Inoue

Patent Number: 6,166,649
Date of Patent: Dec. 26, 2000

[54] DSRC ON-VEHICLE DEVICE

[75] Inventor: Masahiro Inoue, Tokyo, Japan

[73] Assignee: Mitsubishi Denki Kabushiki Kaisha, Tokyo, Japan

[21] Appl. No.: 09/406,800

[22] Filed: Sep. 28, 1999

[30] Foreign Application Priority Data

Apr. 12, 1999 [JP] Japan .................................. 11-104390

[51] Int. Cl.[7] .................................................. G08B 21/00
[52] U.S. Cl. ........................... 340/660; 340/438; 340/439
[58] Field of Search ................................ 340/425.5, 901, 340/660, 661, 438, 440, 439

[56] References Cited

U.S. PATENT DOCUMENTS

| | | | |
|---|---|---|---|
| 4,438,384 | 3/1984 | Akita et al. | 322/99 |
| 5,018,763 | 5/1991 | Okano et al. | 714/23 |
| 5,408,648 | 4/1995 | Gokan et al. | 280/735 |
| 5,661,380 | 8/1997 | Obara et al. | 318/139 |
| 5,671,981 | 9/1997 | Sasaki et al. | 303/122.06 |
| 5,884,986 | 3/1999 | Shimizu | 303/122.12 |

*Primary Examiner*—Edward Lefkowitz
*Attorney, Agent, or Firm*—Sughrue, Mion, Zinn, Macpeak & Seas, PLLC

[57] ABSTRACT

Since a conventional DSRC on-vehicle device does not include a device for informing a user of an abnormal power source voltage even if the power source voltage is abnormal, the user is not aware of the abnormal power source voltage and the DSRC on-vehicle device may not be correctly operated or may be damaged by heat or the like. DSRC on-vehicle device is equipped with an arithmetic processing device, a power supply device for receiving power supplied from a power source of a vehicle, a voltage regulation device for regulating a power source voltage to supply the power source voltage supplied through the power supply device to the arithmetic processing device, an abnormal voltage detection device for determining whether the power source voltage is set within a predetermined range, an abnormality signaling device for informing a user of an abnormality of the power source voltage supplied through the power supply device, and a signal processing device for driving the abnormality signaling device on the basis of an abnormal voltage signal transmitted from the abnormal voltage detection device.

11 Claims, 2 Drawing Sheets

DSRC ON-VEHICLE DEVICE

BACKGROUND OF THE INVENTION

1. Field of the Invention

The present invention relates to DSRC on-vehicle device used in a road transportation system.

2. Description of the Related Art

Recently, DSRC (Dedicated Short-Range Communication) on-vehicle devices are being used in Intelligent Transport Systems (ITS) that are being developed for practical use.

Such DSRC on-vehicle device is, for example, a device used in an ETC (Electronic Toll Collection) system which makes it possible to automatically collect a toll without stopping a vehicle at a highway access or exit.

Although the DSRC on-vehicle device described above is connected to the power source of a vehicle, the vehicle power source voltage is generally either 12 V or 24 V. Therefore, DSRC on-vehicle devices must be tailored for these power source voltages, respectively. In addition, measures must be taken for preventing DSRC on-vehicle device for 12-V power source, for example, from being erroneously connected to 24-V power source.

For conventional DSRC on-vehicle devices, the following counter measures have been considered. That is, described in the user's manuals or the like that DSRC on-vehicle devices for vehicles having 12-V power source voltage should only be used to 12-V power sources, or by having the DSRC on-vehicle devices attached to vehicles only by skilled persons such as salespersons.

However, the 12-V power source sockets, mainly employed in automobiles, and the 24-V power source sockets, mainly employed in large vehicles such as a trucks are of equal size and shape. Consequently, in a DSRC on-vehicle device which receives electric power from a lighter socket, a device for 12-V power source may be erroneously connected to 24-V power source socket.

Even if the DSRC on-vehicle device is correctly connected to the 12-V power source, abnormalities such as over-voltage or low voltage may be generated by problems or the like in the battery or charger.

However, a conventional DSRC on-vehicle device does not have a device inform a user of abnormal voltage supplied from a power source. Hence, even if the power source voltage is abnormal, the user would not realize that the DSRC on-vehicle device is not correctly connected, and the DSRC on-vehicle device would not operate normally, or the DSRC on-vehicle device may be damaged by heat or the like.

SUMMARY OF THE INVENTION

Therefore, the present invention has been made to solve the above problems, and an object thereof is to supply a DSRC on-vehicle device with improved reliability and safety by having a function which informs a user when there is an erroneous connection or an abnormal power-source voltage.

A DSRC on-vehicle device according to this invention is a DSRC on-vehicle device used in short range communication for Intelligent Transport Systems, and is characterized by being equiped with an arithmetic processing device for processing communications traffic between the DSRC on-vehicle device and an on-road unit; a power supply device for receiving power supplied from a power source of a vehicle; a voltage regulation device for regulating a power source voltage to supply the power source voltage supplied through the power supply device to the arithmetic processing means; an abnormal voltage detection device for detecting the power source voltage supplied through the power supply means to determine whether the power source voltage is set within a predetermined range; an abnormality signaling means for informing a user that the power source voltage supplied through the power supply means is abnormal; and a signal processing means for driving the abnormality signaling means on the basis of an abnormal voltage signal transmitted from the abnormal voltage detection means.

Moreover, the DSRC on-vehicle device is characterized in that, in order to suppress variations in detected voltage of the abnormal voltage detection means, a filter is arranged between the power supply means and the abnormal voltage detection means.

Furthermore, the DSRC on-vehicle device may also be characterized in that the abnormality signaling means has a display device for visually signaling a user that the power source voltage is abnormal.

Moreover, the DSRC on-vehicle device may also be characterized in that the abnormality signaling means has a sound source device for visually signaling a user that the power source voltage is abnormal.

Furthermore, the DSRC on-vehicle device may also be characterized in that the abnormality signaling means has a display device for visually informing a user that the power source voltage is abnormal and a sound source device for informing a user that the power source voltage is abnormal.

Moreover, the DSRC on-vehicle device may also be characterized by comprising a power source cutoff means for cutting off power supply from the voltage regulation means to the arithmetic processing means when the abnormal voltage detection means detects an abnormal power source voltage.

Furthermore, the DSRC on-vehicle device may also be characterized by comprising a delay means for setting a predetermined delay time between a time when the abnormal voltage detection means detects an abnormality and a time when the power source cutoff means cuts off power supply from the voltage regulation means.

Moreover, the DSRC on-vehicle device may also be characterized in that the abnormal voltage detection means determines that the power source voltage is abnormal when the power source voltage supplied through the power supply means deviates from the range of 6 V to 18 V.

Furthermore, the DSRC on-vehicle device may also be characterized in that the abnormal voltage detection means has an A/D converter.

Moreover, the DSRC on-vehicle device may also be characterized in that the abnormal voltage detection means has a comparator.

Further, the DSRC on-vehicle device may also be characterized in that hysteresis characteristics are set in a comparative voltage of the comparator.

DESCRIPTION OF THE PREFERRED EMBODIMENT

Embodiment 1

Figure 1:
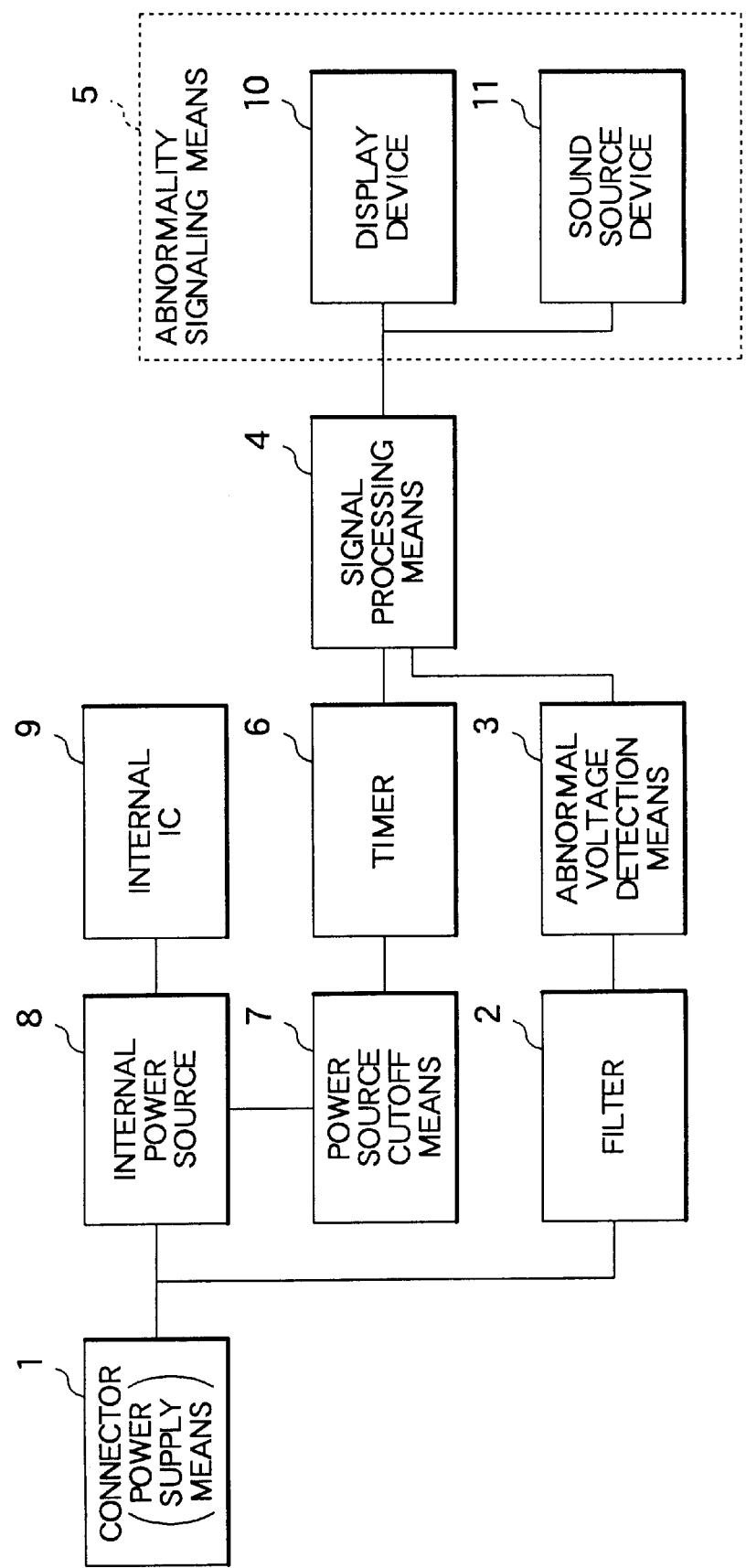
FIG. 1 is a diagram roughly showing the arrangement of DSRC on-vehicle device according to Embodiment 1 of the present invention.

FIG. 1 is a diagram roughly showing the arrangement of DSRC on-vehicle device according to Embodiment 1 of this invention.

As shown in FIG. 1, DSRC on-vehicle device according to Embodiment 1 of this invention comprises a connector 1 serving as a power supply means, a filter 2, an abnormal voltage detection means 3, a signal processing means 4, an abnormality signaling means 5, a timer 6 serving as a delay means, a power source cutoff means 7, an internal power source 8 serving as a voltage regulation means, and an internal IC 9 serving as an arithmetic processing means. Moreover, in FIG. 1, as the abnormality signaling means 5, a display device 10 and a sound source device 11 are illustratively shown.

The abnormal voltage detection means 3 monitors a power source voltage supplied through the connector 1. When the power source voltage becomes more than a predetermined value, the abnormal voltage detection means 3 determines that the power source voltage is abnormal and transmits an abnormal voltage signal to the signal processing means 4.

When the signal processing means 4 receives the abnormal voltage signal from the abnormal voltage detection means 3, the signal processing means 4 operates the abnormality signaling means 5 to inform a user that the power source voltage is abnormal. When the abnormality signaling means 5 signals the user of the abnormal voltage, it is desirable that the abnormal voltage displayed on the display device 10, or that voice guidance indicating the abnormal voltage be generated from the sound source device 11.

In general, an actual power source voltage in a vehicle in which the power source voltage-has a rated value of 12 V falls within the range of 10 V to 16 V depending on the driving conditions. Therefore, in determining an abnormal power source voltage with the abnormal voltage detection means 3, for example, when the power source voltage becomes 18 V or more, the abnormal voltage detection means 3 may determine that the power source voltage is high, and when the power source voltage becomes 6 V or less, the abnormal voltage detection means 3 may determine that the power source voltage is low.

As the abnormal voltage detection means 3, an A/D converter, a comparator and the like may be used.

When an A/D converter is used as the abnormal voltage detection means 3, the value of a voltage input through the filter 2 is converted into a digital value, and the digital value is determined by software installed in a CPU in the signal processing means 4.

Figure 2:
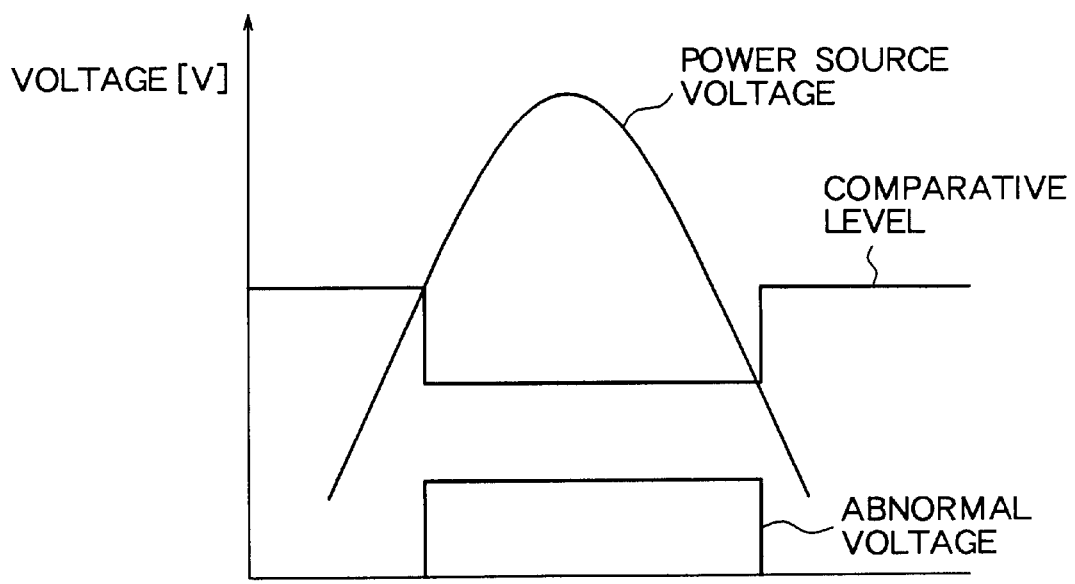
FIG. 2 is a graph showing hysteresis characteristics of a comparative level of a comparator.

FIG. 2 is a graph showing the hysteresis characteristics of a comparative level of a comparator.

When a comparator is used as the abnormal voltage detection means, the comparator compares a power source voltage input through the filter 2 with a comparative voltage to determine an abnormal power source voltage supplied through the connector 1. Moreover, when the comparative level of the comparator has the hysteresis characteristics shown in FIG. 2, chattering can be effectively prevented from occurring when determining an abnormal power source voltage.

A voltage across the input and the output of the internal power source 8 may be measured to monitor the power source voltage. Since an output voltage of the internal power source 8 used as a power source for the internal IC 9 has a known value, the power source voltage supplied through the connector 1 can be calculated on the basis of a difference between the input voltage and the output voltage of the internal power source 8.

Providing the filter 2 shown in FIG. 1 is not absolutely necessary as even DSRC on-vehicle device arranged without the filter 2 can determine an abnormal power source voltage. However, when the filter 2 is used as described above, the precision with which the power source voltage is determined can be improved.

In particular, when starting an engine, is driven, the power source voltage supplied through the connector 1 instantaneously decreases by driving a device such as a sel-motor having high power consumption, therefore, an erroneous operation caused by a decrease in power source voltage can be prevented when the filter 2 is used.

The instantaneous decrease in voltage occurs not only when starting an engine, but also the instant that electrical equipment, such as an air-conditioner, is operated.

When the filter 2 is used, the peak of a ripple voltage generated when a large current is used can be prevented from being erroneously determined to be an-over-voltage.

As the display device 10 constituting the abnormality signaling means 5, a CRT, an LCD, an FL tube, or the like can be used. The display device 10 displays a message such as "abnormal voltage" to visually inform a user of an abnormality. In addition, when it is determined that the power source voltage is an over-voltage, it is displayed on the display device 10 that the power source voltage is an over-voltage, Whereas when it is determined that the power source voltage is a low voltage, it is displayed on the display device 10 that the power source voltage is a low voltage. Thus, the display device 10 can more correctly inform a user of the connection state of the DSRC on-vehicle device.

When a buzzer, a speech generation device, or the like is used as the sound source device 11 constituting the abnormality signaling means 5, the sound source device 11 can aurally inform a user of an abnormal power source voltage.

When a buzzer is used as the sound source device 11, a dedicated buzzer sound representing an abnormal voltage is sounded and if the interval, volume, tone, and the like of the buzzer are changed, a user can be distinctively informed of abnormalities caused by an over-voltage and a low voltage.

When a speech generation device is used as the sound source device 11, a user is informed by speech that the power source voltage is abnormal. In addition, the user is informed by speech that either an abnormality of the power source voltage caused by an over-voltage or a low voltage has occured.

Moreover, when both the display device 10 and the sound source device 11 are provided, the abnormality signaling means 5 becomes more effective.

When the signal processing means 4 detects an over-voltage, power supply to the internal power source 8 is cut off by using the power source cutoff means 7 to cut off an output from the internal power source 8. The power source cutoff means 7 is driven on the basis of an over-voltage signal (abnormal voltage signal) transmitted from the signal processing means 4. As the internal power source 8, for example, a switching regulator or a series regulator may be used. As the power source cutoff means 7, a transistor switch, a relay, or the like may be used.

Power supply to the internal power source 8 can be cut off by not only a cutoff method using the arrangement described above, but also by a method of cutting off power supply to an IC or the like connected to the output side of the internal power source 8, a method of cutting off the operation of the internal power source itself, and the like.

The cutoff of power supply to the internal power source 8 described above is performed until the power source voltage supplied through the connector 1 is turned on again.

As shown in FIG. 1, since the timer 6 is arranged between the signal processing means 4 and the power source cutoff means 7, power supply to the internal power source 8 can be cut off a predetermined period of time from when an abnormal voltage is displayed by the display device 10 or after a predetermined period of time from when a user is informed of an abnormal voltage through the sound source device 11.

When the timer 6 is used as described above, power supply to the internal power source 8 is not cut off immediately after the abnormal voltage detection means 3 detects an abnormal voltage, and power supply to the internal power source 8 can be cut off after a user recognizes that a power source voltage is abnormal through the abnormality signaling means 5.

Moreover, if a predetermined delay time can be set between a time when the abnormal voltage detection means 3 detects an abnormal power source voltage and a time when the power source cutoff means 7 cuts off a voltage output from the internal power source 8 to the internal IC 9, it is not absolutely necessary that the timer 6 be arranged between the signal processing means 4 and the power source cutoff means.

Also, when the abnormal voltage detection means 3 detects a low voltage, the internal power source 8 is cut off. When the power source voltage is excessively low, the DSRC on-vehicle device may be erroneously operated. Consequently, such erroneous operation must be prevented from occurring.

According to this invention, the following advantages can be obtained.

A DSRC on-vehicle device according to this invention is used in short range communication for Intelligent Transport Systems, and is equipped with an arithmetic processing means for processing communications traffic between the DSRC on-vehicle device and an on-road unit; a power supply means for receiving power supplied from a power source of a vehicle; a voltage regulation means for regulating a power source voltage to supply the power source voltage supplied through the power supply means to the arithmetic processing means; an abnormal voltage detection means for detecting the power source voltage supplied through the power supply means to determine whether the power source voltage is set within a predetermined range; an abnormality signaling means for informing a user that the power source voltage supplied through the power supply means is abnormal; and a signal processing means for driving the abnormality signaling means on the basis of an abnormal voltage signal transmitted from the abnormal voltage detection means. Therefore, when the DSRC on-vehicle device is connected to a power source having a voltage value that is different from a rated value of the on-vehicle device or trouble occurs in a charger and the like, a user can be informed of an abnormal power source voltage. Moreover, a highly reliable DSRC on-vehicle device which is prevented from being damaged can be provided.

In order to suppress variations in detected voltage of the abnormal voltage detection means, a filter is arranged between the power supply means and the abnormal voltage detection means. Consequently, DSRC on-vehicle device which is not erroneously operated even if the power source voltage temporarily changes when starting the engine of a vehicle can be provided.

Furthermore, the abnormality signaling means may have a display device for visually informing a user that the power source voltage is abnormal. Therefore, a user can be rapidly and reliably informed of an abnormal power source voltage.

Moreover, the abnormality signaling means may have a sound source device for aurally informing a user that the power source voltage is abnormal. Therefore, the user can be rapidly and reliably informed of an abnormal power source voltage.

Furthermore, the abnormality signaling means may also have a display device for visually informing a user that the power source voltage is abnormal and a sound source device for aurally informing a user that the power source voltage is abnormal Therefore, the user can be rapidly and reliably informed of an abnormal power source voltage.

Moreover, the DSRC on-vehicle device may also comprise the power source cutoff means for cutting off power supply from the voltage regulation means to the arithmetic processing means when the abnormal voltage detection means detects an abnormal power source voltage. Therefore, the DSRC on-vehicle device can be kept from being damaged by an abnormal voltage.

Furthermore, the DSRC on-vehicle device may comprise a delay means for setting a predetermined delay time between a time when the abnormal voltage detection means detects abnormality and a time when the power source cutoff means cuts off power supply from the voltage regulation means. Therefore, a highly reliable DSRC on-vehicle device can be provided.

Moreover, the abnormal voltage detection means determines that the power source voltage is abnormal when the power source voltage supplied through the power supply means deviates from the range of 6 V to 18 V. Therefore, a highly reliable DSRC on-vehicle device can be provided.

Furthermore, the abnormal voltage detection means has an A/D converter. Therefore, DSRC on-vehicle device which can reliably determine an abnormal voltage with a simple arrangement can be provided.

Moreover, the abnormal voltage detection means has a comparator. Therefore, DSRC on-vehicle device which can reliably determine an abnormal voltage with a simple arrangement can be provided.

Further, hysteresis characteristics are set in a comparative voltage of the comparator. Therefore, DSRC on-vehicle device having a high precision of determining an abnormal voltage can be provided.

What is claimed is:

1. A DSRC on-vehicle device used in short range communication for Intelligent Transport Systems, comprising:

arithmetic processing means for processing communications traffic between the DSRC on-vehicle device and an on-road unit;

power supply means for receiving power supplied from a power source of a vehicle;

voltage regulation means for regulating a power source voltage to supply the power source voltage supplied through the power supply means to the arithmetic processing means;

abnormal voltage detection means for detecting the power source voltage supplied through the power supply means to determine whether the power source voltage is set within a predetermined range;

abnormality signaling means for informing a user that the power source voltage supplied through the power supply means is abnormal; and signal processing means for driving the abnormality signaling means on the basis of an abnormal voltage signal transmitted from the abnormal voltage detection means.

2. ADSRC on-vehicle device according to claim 1, wherein, in order to suppress variations in detected voltage of the abnormal voltage detection means, a filter is arranged between the power supply means and the abnormal voltage detection means.

3. A DSRC on-vehicle device according to claim 1, wherein the abnormality signaling means has a display device for visually signaling a user that the power source voltage is abnormal.

4. A DSRC on-vehicle device according to claim 1, wherein the abnormality signaling means has a sound source device for aurally signaling a user that the power source voltage is abnormal.

5. A DSRC on-vehicle device according to claim 1, wherein the abnormality signaling means has a display device for informing a user that the power source voltage is abnormal through her/his sense of sight and a sound source device for informing a user that the power source voltage is abnormal.

6. A DSRC on-vehicle device according to claim 1, comprising power source cutoff means for cutting off power supply from the voltage regulation means to the arithmetic processing means when the abnormal voltage detection means detects an abnormal power source voltage.

7. A DSRC on-vehicle device according to claim 6, comprising delay means for setting a predetermined delay time between a time when the abnormal voltage detection means detects an abnormality and a time when the power source cutoff means cuts off power supply from the voltage regulation means.

8. A DSRC on-vehicle device according to claim 1, wherein the abnormal voltage detection means determines that the power source voltage is abnormal when the power source voltage supplied through the power supply means deviates from the range of 6 V to 18 V.

9. A DSRC on-vehicle device according to claim 1, wherein the abnormal voltage detection means has an A/D converter.

10. ADSRC on-vehicle device according to claim 1, wherein the abnormal voltage detection means has a comparator.

11. A DSRC on-vehicle device according to claim 10, wherein hysteresis characteristics are set in a comparative voltage of the comparator.

\* \* \* \* \*